United States Patent [19]

Mantela et al.

[11] Patent Number: 4,606,687

[45] Date of Patent: Aug. 19, 1986

[54] RESILIENT TIE-DOWN DEVICE

[75] Inventors: Ralph F. Mantela, Union Lake; Thomas L. Savich, Brighton, both of Mich.

[73] Assignee: General Motors Corporation, Detroit, Mich.

[21] Appl. No.: 712,418

[22] Filed: Mar. 15, 1985

[51] Int. Cl.$^4$ .............................................. B60P 3/06
[52] U.S. Cl. ...................................... 410/23; 267/69; 24/300
[58] Field of Search .................. 410/7, 10, 11, 12, 20, 410/23, 96, 101, 103; 267/69, 73, 74, 75, 148, 152, 153; 24/300, 301, 302

[56] References Cited

U.S. PATENT DOCUMENTS

| | | | |
|---|---|---|---|
| 941,659 | 11/1909 | Shea | 267/74 |
| 1,474,340 | 11/1923 | Albin | 267/69 |
| 2,847,207 | 8/1958 | Chulack et al. | 410/23 |
| 3,692,361 | 9/1972 | Ivarsson | 267/69 |
| 4,022,134 | 5/1977 | Krokus | 410/23 |

Primary Examiner—Robert B. Reeves
Assistant Examiner—Dennis C. Rodgers
Attorney, Agent, or Firm—Edward J. Biskup

[57] ABSTRACT

A tie-down device interposed between a hook adapted to be connected to a vehicle frame and a chain adapted to be connected to a transporter and characterized in that the tie-down device includes a webbing which is encapsulated in a rubber jacket with the webbing being folded so as to provide a pair of longitudinally spaced loop portions one of which is formed by the overlapped and sewn together ends of the webbing and is connected through a spool member to the hook and the other of which is connected through a spool member to the chain.

3 Claims, 7 Drawing Figures

U.S. Patent Aug. 19, 1986 Sheet 2 of 2 4,606,687
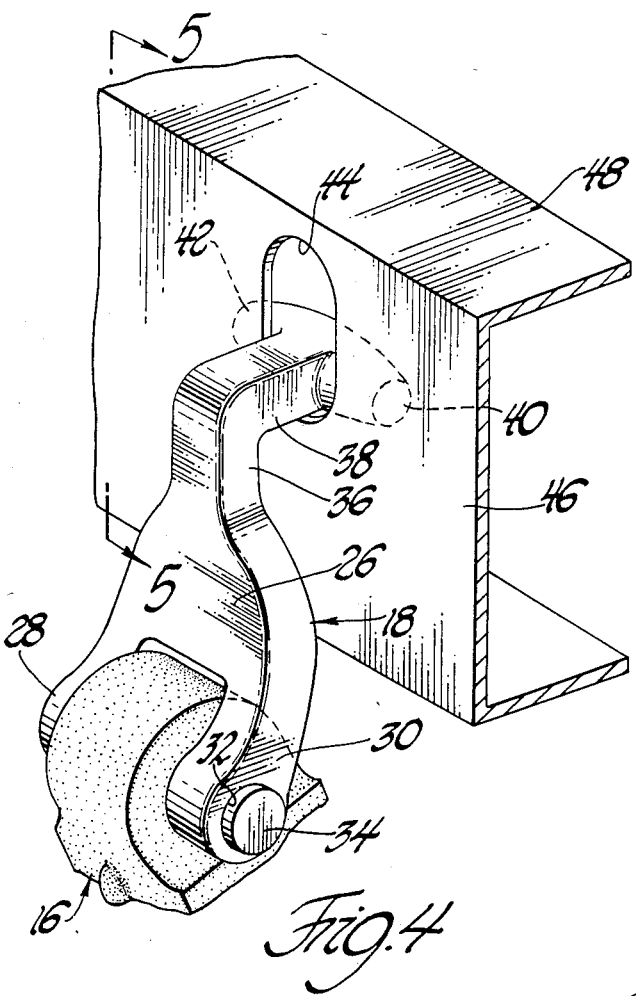
Fig. 4
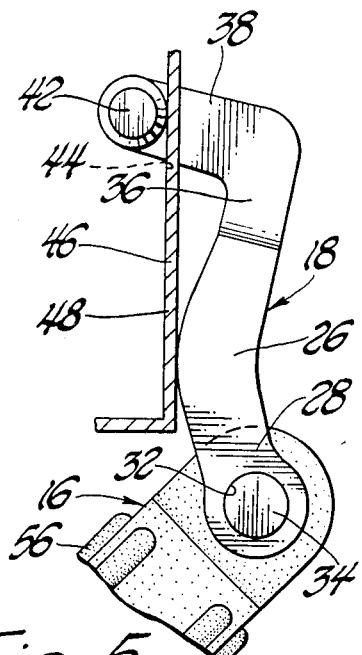
Fig. 5
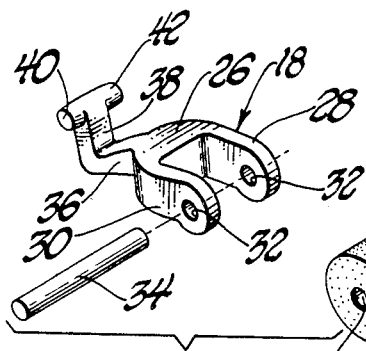
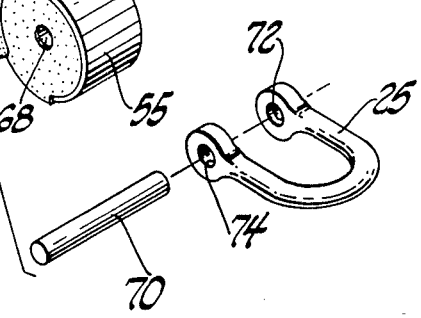
Fig. 6
Fig. 7

RESILIENT TIE-DOWN DEVICE

This invention concerns restraint systems and more particularly relates to a resilient tiedown device for securing automobiles and the like to a transporter such as a railway car.

U.S. patent application Ser. No. 469,254, now U.S. Pat. No. 4,573,842, entitled, "Resilient Tie-Down Device", filed Feb. 24, 1983 in the name of Ralph F. Mantela et al and assigned to the assignee of this invention, relates to a resilient tie-down device which is located in series with the tie-down device connected to the bed of the vehicle transporter and the hook connected to the vehicle frame. The resilient tie-down device provides compliance in the restraint system which filters high frequency forces normally transmitted through the chain and eliminates impacts due to chain slack action. The resilient tie-down device disclosed in the aforementioned application is formed with a strap which is pretensioned and encapsulated within a jacket of elastomeric material. The strap takes the form of a webbing with the opposite ends thereof overlapped and sewn together so as to form a pair of loop portions each of which receives a guide spool member. The overlapped joint formed by the opposite ends of the strap is located substantially midway between the guide spool members located in the two loop portions, and the guide spool member at one end of the strap is pivotally connected to the hook while the guide spool member at the other end of the strap is pivotally connected to the chain by a clevis. In this manner, the vehicle is connected to the transporter and held thereon by the restraint system, and the resilient tie-down device serves as a cushion to limit the shock loads created by inertial forces acting on the vehicle during the transit thereof.

Although the above-described tie-down device has proved successful for absorbing shock loads created by inertial movement of a vehicle, field testing has revealed that compatability and durability with all sizes of automobiles would be improved if the device is shortened. Accordingly, the device was initially shortened by bringing the guide spool members closer together while maintaining the overlapped joint midway therebetween and encapsulating the strap as done in the prior device. It was discovered, however, that the device when so constructed did not provide sufficient stretchability or elongation to filter the high frequency forces normally transmitted through the chain to the vehicle. As a result, several other configurations were tested, and afterwards it was found that acceptable elongation of the shortened tie-down device would be achieved when the overlapped joint is positioned or wrapped around one of the guide spool members.

Accordingly, the objects of the present invention are to provide a new and improved restraint system which employs a resilient tie-down device having a webbing formed with loop portions at opposite ends thereof with one of the loops being formed by the overlapped ends of the webbing; to provide a new and improved resilient tie-down device interposed between a hook adapted to be connected to a vehicle frame and a chain adapted to be connected to a transporter and characterized in that the resilient tie-down device includes a webbing which is encapsulated in a rubber jacket with the webbing providing a pair of loop portions one of which is formed by the overlapped and sewn together ends of the webbing and is connected through a guide spool member to the hook, and the other of which is connected through a guide spool member to the chain; and to provide a new and improved resilient tie-down device which includes a strap made of woven material that is wrapped around a pair of spaced guide spool members so as to provide a pair of loop portions with one of the loop portions being formed by the overlapped and interconnected ends of the strap and being protected from abrasion by a metal clip.

Other objects and advantages of the present invention will be apparent from the following detailed description when taken with the drawings in which:

FIG. 4 is an enlarged perspective view showing the hook of FIGS. 2 and 3 connected to the vertical side wall of the vehicle frame;

FIG. 5 is a side view of the hook taken on line 5—5 of FIG. 4;

FIG. 6 is an exploded view showing the strap and the guide spool members incorporated in the resilient tie-down device shown in FIGS. 1 through 3; and FIG. 7 is an exploded view of the hook, the resilient tie-down device, the clevis and the pins which pivotally interconnect these members to form a part of the restraint system shown in FIG. 1.

Figure 1:
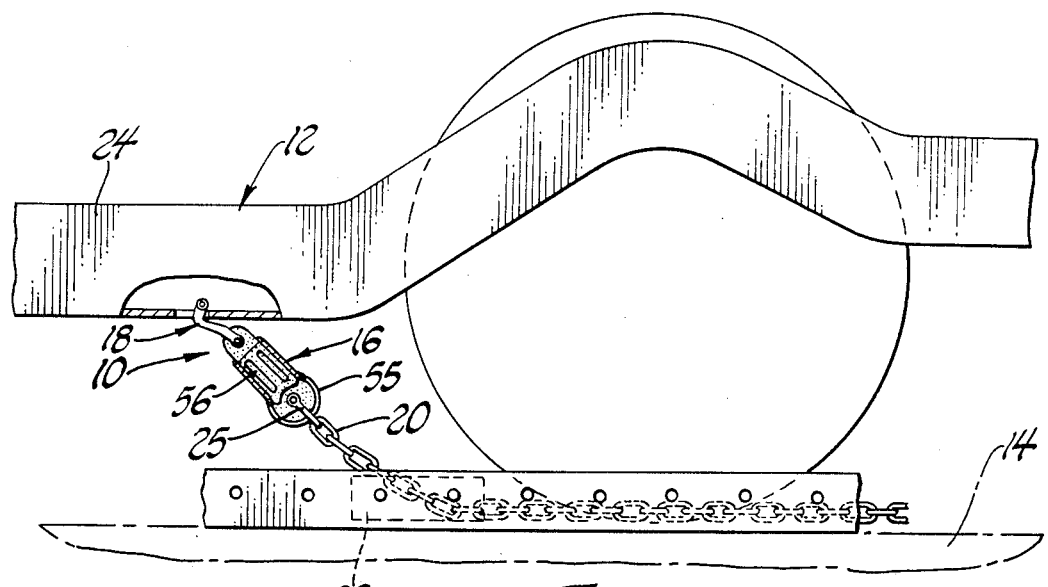
FIG. 1 is a fragmentary side elevational view of a vehicle secured to a transporter by a restraint system incorporating a resilient tie-down device made in accordance with the present invention.

Referring to the drawings and more particularly FIG. 1 thereof, a restraint system 10 is shown which serves to secure a vehicle 12 to the deck 14 of a transporter and incorporates a resilient tie-down device 16 made in accodance with the present invention. In general, the restraint system 10 comprises the resilient tie-down device 16, a hook device 18, and a chain 20 which passes through a idler assembly 22 and is connected to the usual capstan and rachet (not shown) for anchoring and tightening the chain 20. The resilient tie-down device 16 is in series with and interposed between the hook device 18 and the chain 20, and one end of the hook device 18, as seen in FIG. 1, is connected to the lower horizontal surface of the vehicle frame 24 while the other end of the hook device 18 is pivotally connected to the resilient tie-down device 16. The tie-down device 16, in turn, is pivotally connected to a clevis 25 which forms a part of the chain 20. Although not shown, a restraint system such as described above may be located adjacent to each of the four wheels of the vehicle 12 for securing the latter to the deck 14 of the transporter.

Figure 3:
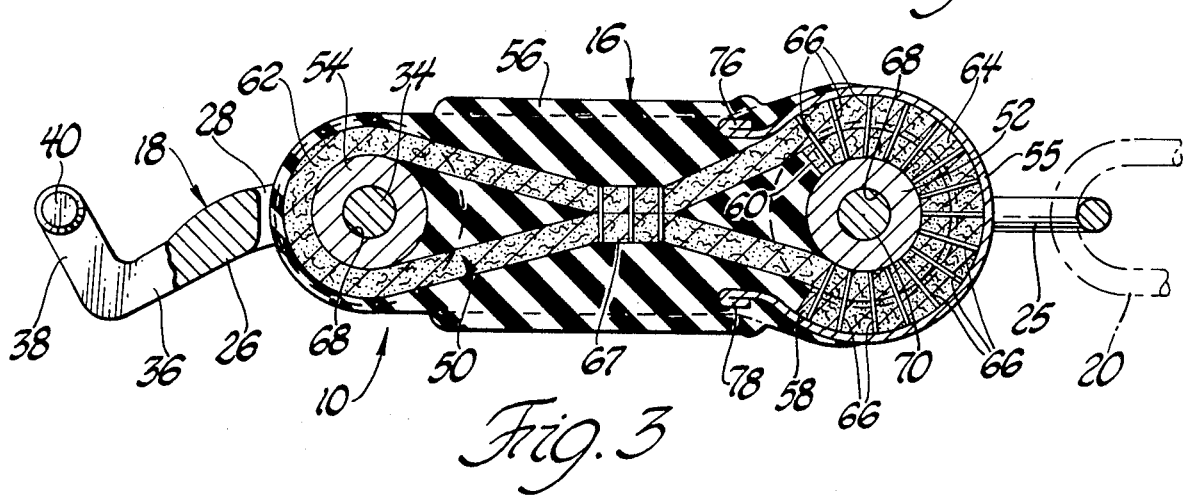
FIG. 3 is a sectional view taken on line 3—3 of FIG. 2.

More specifically, the hook device 18, which forms a part of the restraint system 10, includes a keystone-shaped body portion 26 integrally formed with a pair of laterally spaced and transversely aligned legs 28 and 30. As seen in FIG. 3, each of the legs 28 and 30 are located in a plane angled relative to the central plane of the body portion 26 of the hook device 18. Each leg 28 and 30 has an aperture 32 formed therein for receiving one end of a pin 34 which extends through one end of the resilient tie-down device 16 and serves as a pivotal connection means therebetween.

The body portion 26 of the hook device 18 is also formed with a gooseneck which, as seen in FIGS. 2, 3, 4, 5, and 7, consists of a first neck portion 36 integral with the body portion 26 and a second neck portion 38 which is angularly displaced relative to the first neck portion 36 at an angle of approximately 90°. The first neck portion 36 of the gooseneck has the longitudinal center axis thereof substantially aligned with the central plane of the body portion 26 as seen in FIG. 3. The free end of the second neck portion 38 of the gooseneck is integrally formed with a pair of members 40 and 42 which project laterally outwardly from the opposite sides of the free end of the second neck portion 38. Each of the members 40 and 42 are substantially conical in configuration and together define a head which is adapted to be inserted into an oblong slot and rotated 90° for connecting the hook device 18 to a vehicle. In this regard and as seen in FIG. 1, the head of the hook device 18 is located in a slot formed in the lower horizontal plate portion of the vehicle frame 24. An alternate method of connecting the hook device 18 to the frame of a vehicle is seen in FIGS. 4 and 5 wherein the head (defined by members 40 and 42) of the hook device 18 is shown located in a slot 44 formed in the vertical plate portion 46 of a frame 48. In this case, the body portion 26 of the hook device 18 contacts the outer surface of the vertical plate portion 46 and serves as a load-bearing member for distributing the load and preventing stress concentrations in one small area of the frame.

Referring now to FIGS. 2, 3, 6, and 7 of the drawing, the resilient tie-down device 16 comprises a pretensioned strap 50, a pair of identical guide spool members 52 and 54, a U-shaped metal spring clip 55, and a jacket 56 made of elastomeric material such as rubber. The strap 50 consists of an elongated webbing made from a high tenacity yarn such as Nylon 66. As seen in FIGS. 3 and 6, the opposite ends 58 and 60 of the webbing are doubled over and interconnected at one end so as to form a pair of loop portions 62 and 64. The loop portion 64 formed by the overlapped ends 58, 60 of the webbing is provided with and enclosed by the spring clip 55 which serves to protect the webbing at this end from abrasion. Also, the overlapped sections of the webbing are stitched together with a Nylon sewing thread 66 with sufficient stitches per inch so as to provide a minimum breaking strength of 9,000 pounds when the strap 50 is subjected to tensile loading. Preferably, the stitching is applied across the entire area of the overlapped joint in a zigzag path to form several laced patterns and the ends of the stitching can be backstitched to provide increased strength. Afterwards the intermediate portion 67 of the webbing is tacked merely to maintain the central portion thereof together during the molding process to be described hereinafter.

Figure 2:
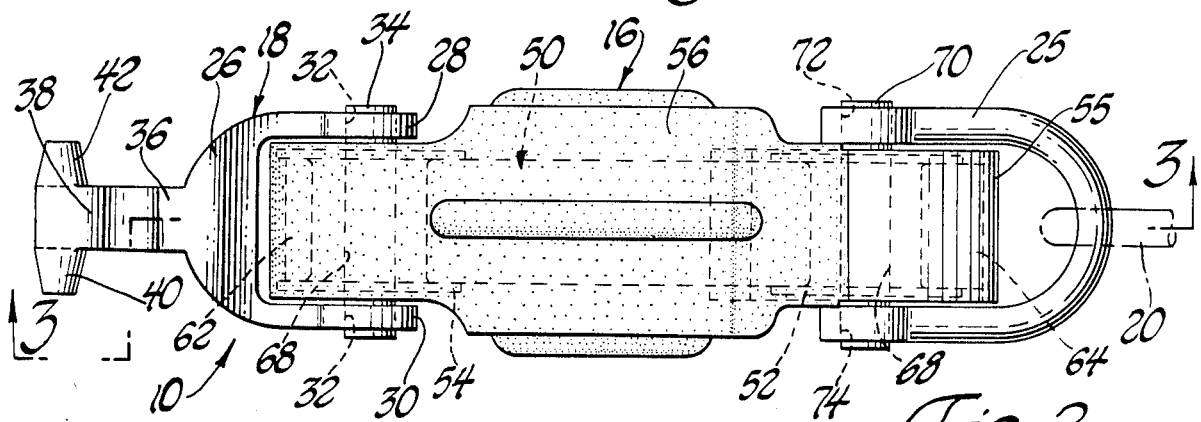
FIG. 2 is an enlarged plan view of the resilient tie-down device shown in FIG. 1 with one end of the tie-down device connected to a hook and the other end connected to a clevis.

The respective loop portions 62 and 64 accommodate the guide spool members 52 and 54 each of which is made of steel and has an axial bore 68. As best seen in FIGS. 2 and 3, the bore 68 of the guide spool member 54 located in the loop portion 62 receives the pin 34 extending between the legs 28 and 30 of the hook device 18 so as to provide a pivotal connection between the hook device 18 and the guide spool member 54. Similarly, the bore 68 of the guide spool member 52 located in the loop portion 64 receives a pin 70 the ends of which are located within the accommodating bores 72 and 74 formed in the clevis 25 connected to the chain 20. As will be explained more fully hereinafter, except for the loop portion 64 and the clip 55, the strap 50 is encapsulated in the rubber jacket 56 which serves to resist wear, abrasion, cutting, as well as chemical encountered during rail shipping of a vehicle.

In this regard, a method of pretensioning and encapsulating the strap 50 in an elastomeric material is shown and described in the aforementioned patent application. For the purposes of this specification, it will suffice to say that in practicing the method, initially the guide spool members 52 and 54, are coated with an ahesive so as to insure that a proper adhesion is realized between the elastomeric material, the webbing, and each guide spool member. In addition, the clip 55 is phosphate coated and treated with the same adhesive as applied to the guide spool members 52 and 54. An adhesive that may be used for this purpose is manufactured by Lord Corporation, Erie, Pa. and is identified as CHEMLOK 205,238.

The guide spool members 52 and 54 are then inserted within the loop portions 62 and 64, of the strap 50. As aforementioned, the strap 50 should be made from a high tenacity yarn. A strap identical to strap 50 that has been found to provide the desired strength and yield characteristics is manufactured by Burlington Industries, Dorval, Quebec, Canada and is identified as No. 0774. The strap made by Burlington Industries is made of a Nylon 66 yarn and provides a minimum breaking elongation of 30%. The overlapped joint at the loop portion 64 can be sewn together using a zigzag pattern using Nylon thread so as to provide a minimum breaking strength of 9,000 lbs.

After the guide spool members 52 and 54 are inserted into the loop portions 62 and 64 of the strap 50, the clip 55 is positioned about the loop portion 64 as seen in FIG. 3. The guide spool member 52 is then connected by a pin to a support member. In the same manner, the guide spool member 54 of the loop portion 62 is connected to a support member by a pin.

The entire assembly which includes the strap 50, guide spool members 52 and 54, the spring clip 55, and the connected support members, is then placed into a cavity formed in the lower half of a mold. At the same time the strap 50 and the attached support members are positioned in the cavity of the mold, filler members made of elastomeric material and each having a slab configuration are located in the cavity, one being located below the strap 50, one being located to one side of the strap 50, and one above the strap 50. The three filler members serve to maintain the tacked midsection 67 of the strap 50 centrally located in the cavity during the molding operation. After the filler members are placed in the cavity, the upper half of the mold, which is a mirror image of the lower half and is formed with an identical cavity, is placed on the lower half of the mold to close the mold. A top retainer plate, then serves to lock the upper portion of the two halves of the mold together and the mold is ready for positioning in a press. When the mold is placed in the press, the upper portion of the mold is held together by the top retainer plate while the lower portion of the mold is maintained in position by stops mounted on the base of the press. Also, a molding pot, in the form of a cylindrical cavity is located on top of the retainer plate. The molding pot is connected to the cavity of the mold halves appropriately aligned passages formed therein.

Prior to the molding operation, an elastomeric material, which preferably is the same in composition as the composition of the filler members, is placed into the molding pot and subsequently the molding pot is covered with a plunger. The molding pot is heated to a temperature which melts the elastomeric material and sufficient force is then applied to the plunger to cause the melted elastomeric material into the cavity of the mold to form the jacket 56 around the strap 50 as seen in FIGS. 3 and 7 while leaving essentially the entire clip 55 uncovered except for the ends 76 and 78 thereof which are embedded in the jacket 56. The temperature as well as the pressure on the plunger is maintained until the jacket of elastomeric material is cured. After the jacket is cured, the two halves of the mold are disassembled and the completed resilient tie-down device is detached from the support members, trimmed and is ready for use in the restraint system 10 described hereinbefore.

It will be noted that, both of the aforementioned support members connected to the guide spool members 52 and 54 during the molding operations, are sized to completely fill the area of the cavity where each support member is located when, the mold is closed. Also, one of the support members is fixed in the cavity of the mold while the other support member is slidably mounted therein. Thus, when the melted elastomeric material is injected into the mold under pressure, the pressurized material causes the slidable support member to move away from the fixed support member so as to place the strap 50 in tension. The tension within the strap 50 is maintained while the elastomeric material cures in the mold and after the completed tie-down device is removed from the mold, the pretensioned strap serves to place the jacket 56 in compression. It has been found that making the tie-down device 16 by a method as described above, results in a tie-down device that has a linear spring rate.

Finally, it will be noted that the aforedescribed filler members can be eliminated if the mold is positioned in the press so that the longitudinal axis of the mold is located in the vertical plane. By so doing, the weight of the lower slidable support member will pull down on the strap 50 and cause it to be centrally located in the cavity of the mold.

Various changes and modifications can be made in the above-described invention without departing from the spirit of the invention. Accordingly, the inventors do not wish to be limited except by the scope of the appended claims.

The embodiments of the invention in which an exclusive property or privilege is claimed are defined as follows:

1. A restraint system for securing the frame of a vehicle to the support platform of a transporter, said restraint system including a hook device one end of which is provided with a head adapted to be connected to said frame and the other end of which is connected to a transversely extending pin, a chain adapted to be anchored at one end to said transporter, and a resilient tie-down device interconnecting said pin of said hook member to said chain, the improvement wherein said resilient tie-down device comprises a strap made of woven yarn of synthetic material having the two ends thereof overlapped and sewn together to provide an overlapped joint, a pair of guide spool members, said strap being folded so as to provide a pair of spaced loop portions with said overlapped joint forming one of said spaced loop portions, one of said pair of guide spool members being located in said one of said spaced loop portions and the other of said pair of guide spool members being located in the other of said spaced loop portions so as to permit said strap to have a breaking elongation of at least 30% when a separating force is applied to said spaced guide spool members, said guide spool members adapted to be pivotally connected to said chain and to said pin of said hook, and said strap being pretensioned and encapsulated in a jacket of elastomeric material so that said elastomeric material together with the strap serves to reduce forces transmitted to the vehicle from the transporter during shipping.

2. A restraint system for securing the frame of a vehicle to the support platform of a transporter, said restraint system including a hook device one end of which is provided with a head adapted to be connected to said frame and the other end of which is connected to a transversely extending pin, a chain adapted to be anchored at one end to said transporter, and a resilient tie-down device interconnecting said pin of said hook member to said chain, the improvement wherein said resilient tie-down device comprises a strap made of woven yarn of synthetic material having the two ends thereof overlapped and sewn together to provide an overlapped joint, a pair of guide spool members, said strap being folded so as to provide a pair of spaced loop portions with said overlapped joint forming one of said spaced loop portions, one of said pair of guide spool members being located in said one of said spaced loop portions and the other of said pair of guide spool members being located in the other of said spaced loop portions so as to permit said strap to have a breaking elongation of at least 30% when a separating force is applied to said spaced guide spool members, a metal clip shielding said one of said spaced loop portions, said guide spool members adapted to be pivotally connected to said chain and to said pin of said hook, and said strap being pretensioned and encapsulated in a jacket of elastomeric material so that said elastomeric material together with the strap serves to reduce forces transmitted to the vehicle from the transporter during shipping.

3. A restraint system for securing the frame of a vehicle to the support platform of a transporter, said restraint system including a hook device one end of which is provided with a head adapted to be connected to said frame and the other end of which is connected to a transversely extending pin, a chain adapted to be anchored at one end to said transporter, and a resilient tie-down device interconnecting said pin of said hook member to said chain, the improvement wherein said resilient tie-down device comprises a strap made of woven yarn of synthetic material having the two ends thereof overlapped and sewn together to provide an overlapped joint, a pair of guide spool members, said strap being folded so as to provide a pair of spaced loop portions with said overlapped joint forming one of said spaced loop portions, one of said pair of guide spool members being located in said one of said spaced loop portions and the other of said pair of guide spool members being located in the other of said spaced loop portions so as to permit said strap to have a breaking elongation of at least 30% when a separating force is applied to said spaced guide spool members, a U-shaped metal clip encircling said one of said spaced loop portions, said guide spool members adapted to be pivotally connected to said chain and to said pin of said hook, and said strap being pretensioned and together with said other of said spaced loop portions encapsulated in a jacket of elastomeric material so that said elastomeric material together with the strap serves to reduce forces transmitted to the vehicle from the transporter during shipping.

* * * * *